April 26, 1949.                J. C. PADDOCK                2,468,375
                    TRUCK FOR TRANSPORTING BOBBINS,
                            QUILLS, OR SPOOLS
Filed Feb. 19, 1947                                      5 Sheets-Sheet 1
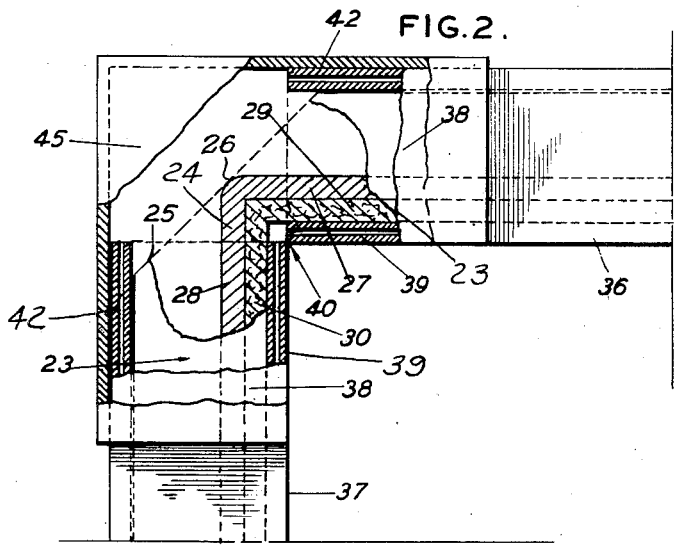
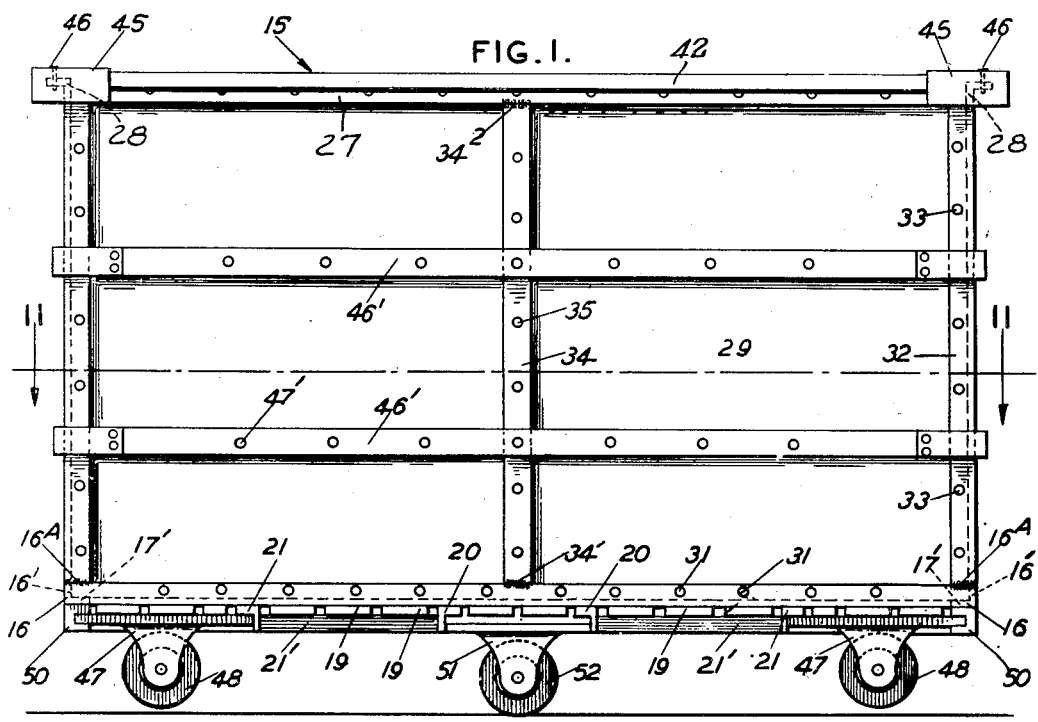
INVENTOR
J. C. PADDOCK
BY
ATTORNEY

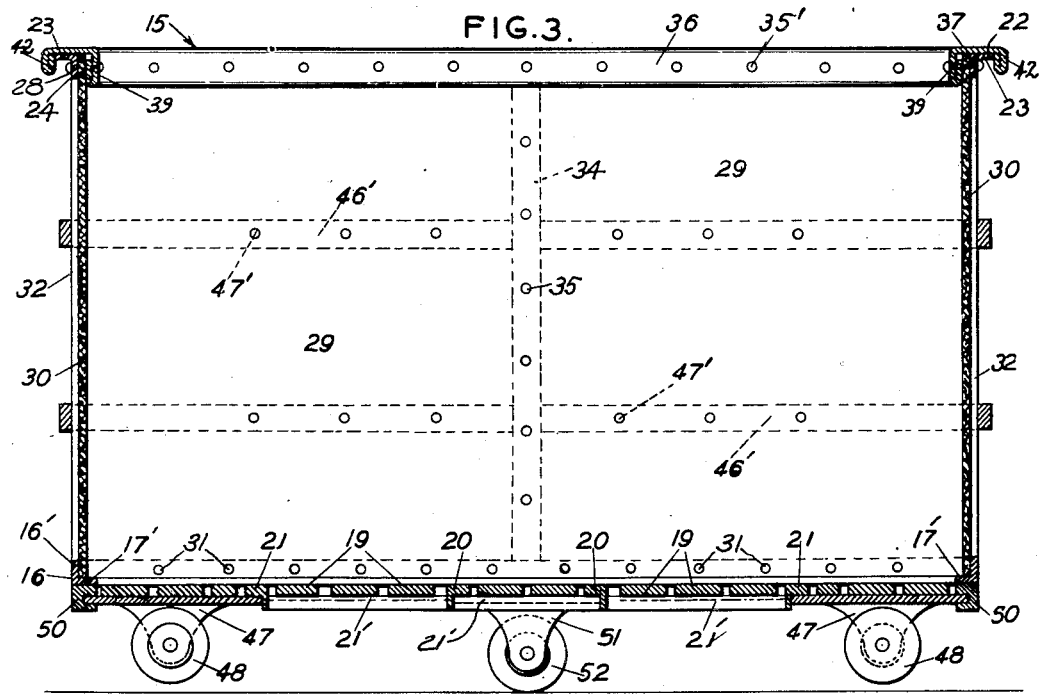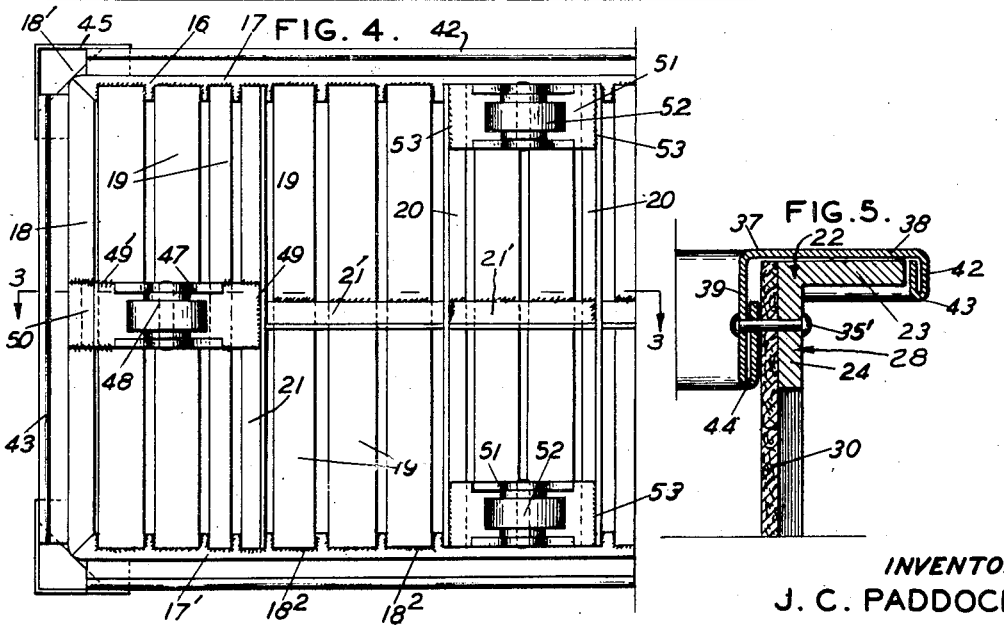

April 26, 1949.  J. C. PADDOCK  2,468,375
TRUCK FOR TRANSPORTING BOBBINS, QUILLS, OR SPOOLS
Filed Feb. 19, 1947  5 Sheets-Sheet 3
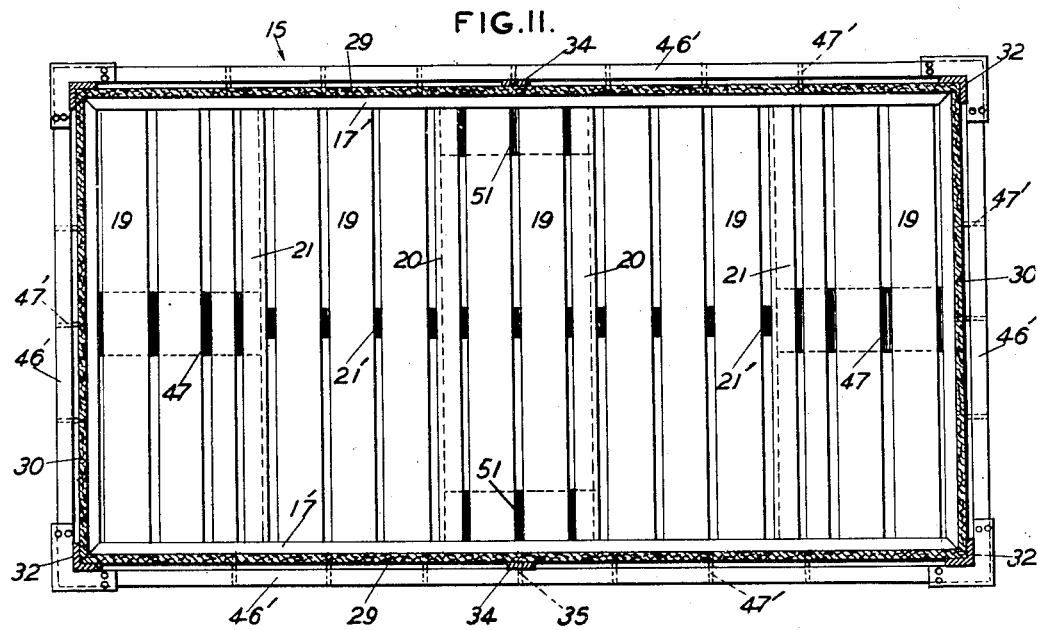
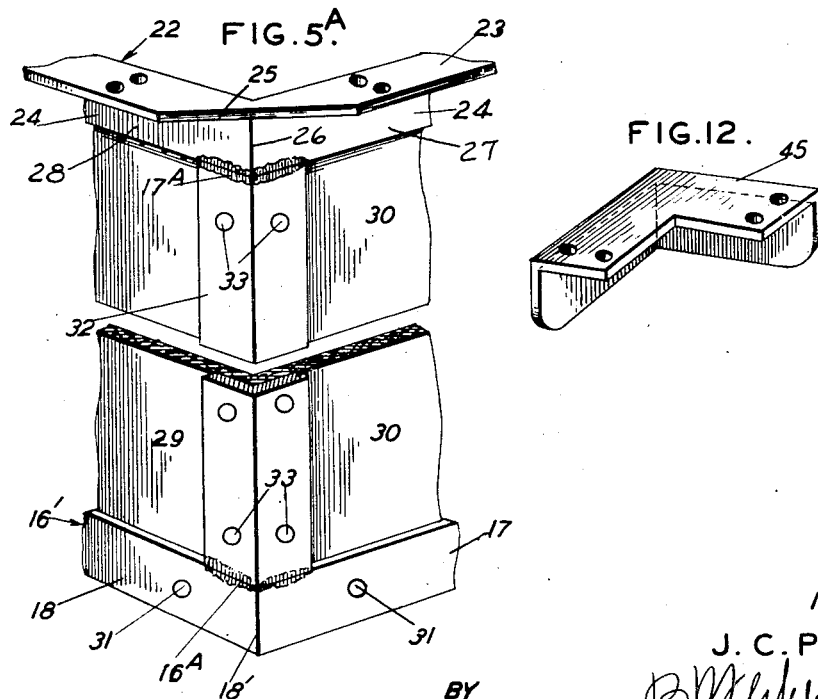
INVENTOR
J. C. PADDOCK
ATTORNEY April 26, 1949.  J. C. PADDOCK  2,468,375
TRUCK FOR TRANSPORTING BOBBINS, QUILLS, OR SPOOLS Filed Feb. 19, 1947  5 Sheets-Sheet 4

INVENTOR.
J. C. PADDOCK
BY
ATTORNEY

April 26, 1949. J. C. PADDOCK 2,468,375
TRUCK FOR TRANSPORTING BOBBINS,
QUILLS, OR SPOOLS
Filed Feb. 19, 1947 5 Sheets-Sheet 5
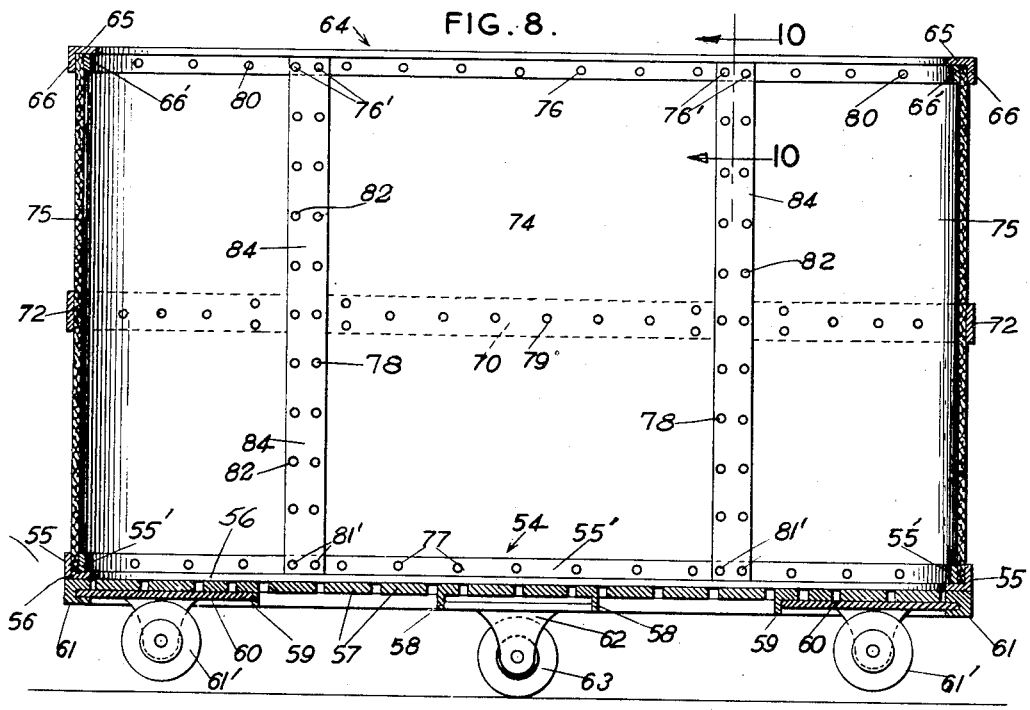
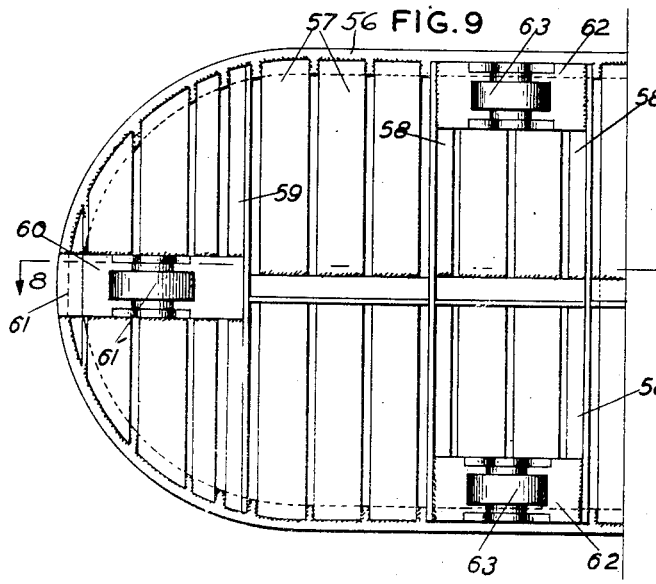
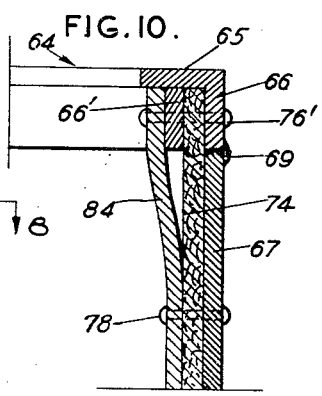
INVENTOR
J. C. PADDOCK
BY
ATTORNEY Patented Apr. 26, 1949

2,468,375

UNITED STATES PATENT OFFICE 2,468,375

TRUCK FOR TRANSPORTING BOBBINS, QUILLS OR SPOOLS

John C. Paddock, Spartanburg, S. C.

Application February 19, 1947, Serial No. 729,512

1 Claim. (Cl. 280—54)

My invention relates to trucks for transporting bobbins, quills or spools, in textile mills or the like.

An important object of the invention is to provide a truck of the above mentioned character, which has a metal slatted bottom, imparting the desired strength to the truck, and eliminating the catching of the yarn or filling, caused by the splintering of a wooden bottom.

A further object of the invention is to provide means whereby the intermediate wheels may be secured to the bottom of the truck to project below the end wheels, to render steering easy.

A further object of the invention is to provide a cover for the top frame, affording a neat appearance and protecting the hands of the operator.

A further object of the invention is to provide a truck of the above mentioned character, having rounded ends or corners so that they will glance off of obstructions when striking the same.

A further object of the invention is to provide a truck of the above mentioned character including a body formed of fiber or the like and which is secured to a metal frame, to properly reenforce and stiffen the same.

Other objects and advantages of the invention will be apparent during the course of the following description.

Figure 6:
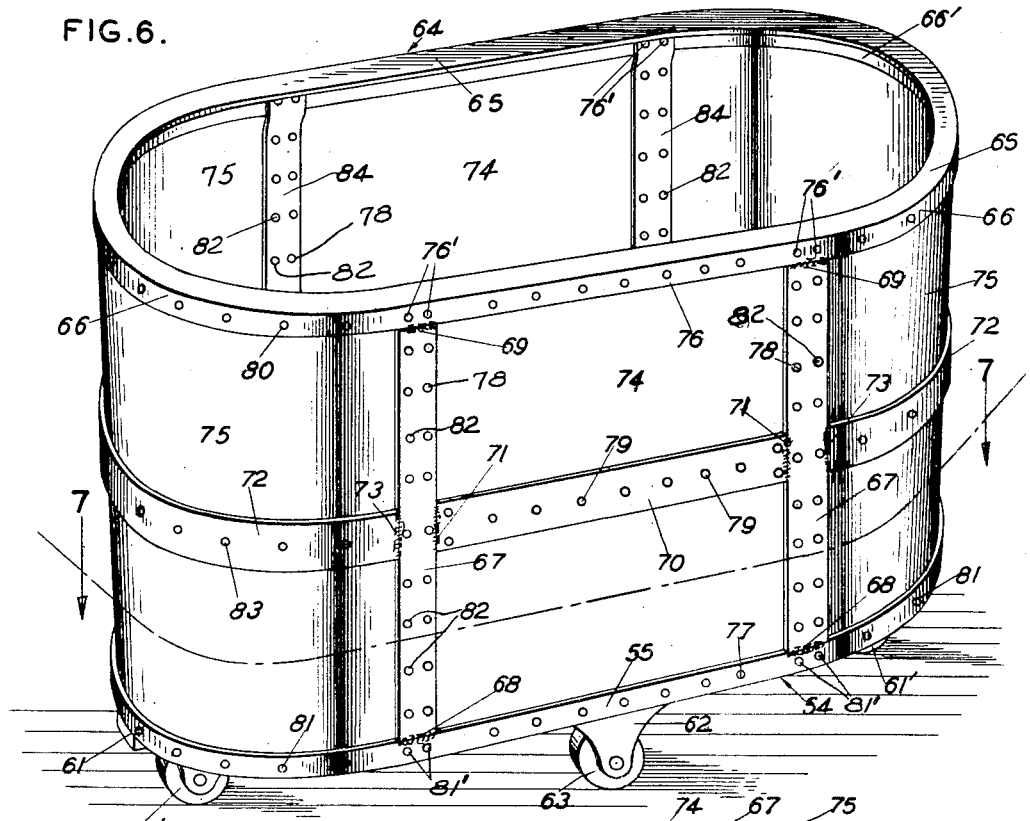
Figure 7:
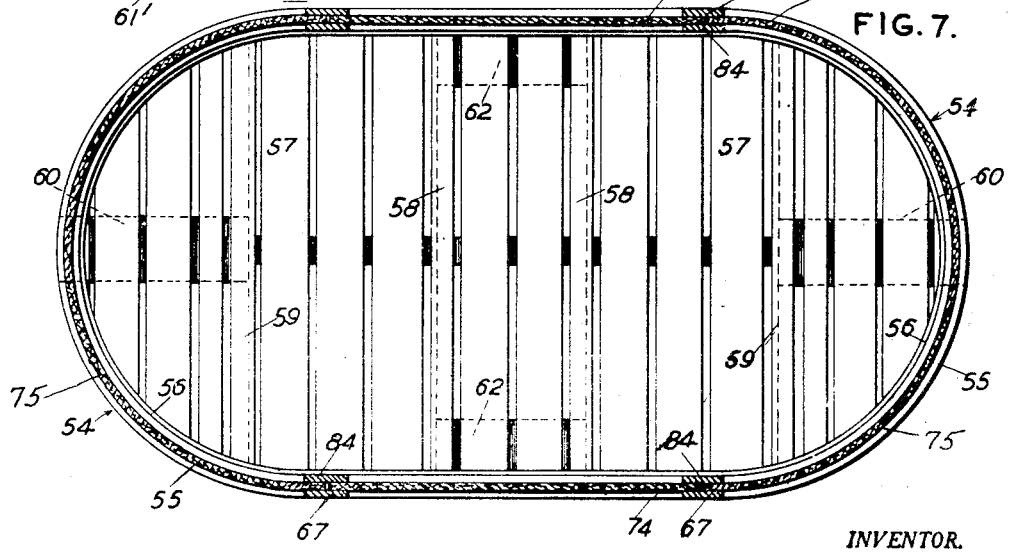

In the accompanying drawings forming a part of this application and in which like numerals are employed to designate like parts throughout the same, Figure 1 is a side elevation of a truck embodying my invention, Figure 2 is an enlarged plan view of a corner of the truck, parts in horizontal section, and parts broken away, Figure 3 is a central vertical longitudinal section through the truck, taken on line 3—3 of Figure 4, Figure 4 is a bottom plan view of the truck, parts broken away, Figure 5 is a vertical section through the top frame of the truck and associated elements, corresponding to Figure 3, but on an enlarged scale, Figure 5<sup>A</sup> is a perspective view of one corner angle-iron and associated elements, parts broken away, Figure 6 is a perspective view of a truck embodying a modified form of the invention, Figure 7 is a horizontal section taken on line 7—7 of Figure 6, Figure 8 is a central vertical longitudinal section through the truck, Figure 6, Figure 9 is a bottom plan view of the truck, Figure 6, parts broken away, Figure 10 is an enlarged section taken on line 10—10 of Figure 8, Figure 11 is a horizontal section taken on line 11—11 of Figure 1, and Figure 12 is a perspective view of a corner socket.

Attention is called first to Figures 1 to 5 inclusive, 5<sup>A</sup>, 11 and 12, wherein the first form of the invention is shown. In these figures, the numeral 15 designates a truck, as a whole, comprising a bottom elongated rectangular frame 16, formed of an angle-iron having a vertical web 16' and a horizontal web 17'. The horizontal web 17' is cut at intervals and the vertical web 16' is bent upon itself to produce corners 18' and sides 17 and ends 18. The ends of the web 16' are welded together and the sides 17 and ends 18 are rigidly connected. The frame 16 constitutes a part of the bottom of the truck. This bottom further comprises metal slats 19, which may vary in width. Arranged between certain of the slats 19 are intermediate transverse angle-irons 20 and end transverse angle-irons 21, having depending vertical webs. The transverse slats and the angle irons are positioned beneath the horizontal webs 17' of the sides 17 and overlap such webs and are rigidly secured thereto by welding along the lines 18². The metal slats and metal angle-irons are transversely spaced, preferably for about three eights of an inch. The numeral 21' designates longitudinal angle-irons, which are welded to the slats 19 and the angle-irons 20 and 21.

An elongated top frame 22 is provided, formed from an angle-iron having an upper horizontal web 23 and a vertical depending web 24. The horizontal web is cut away at intervals, as shown at 25, Figure 2, whereby the vertical web 24 may be bent upon itself at 26, forming sides 27 and ends 28. The horizontal webs 23 are cut away at the corners of the frame 22, at 25, as stated.

The body portion of the truck comprises sides 29 and ends 30, formed of fiber or the like. These sides and ends are shown as flat, but they may be corrugated sheets, such as corrugated sheet metal. The bottom edges of the sides 29 and ends 30 are assembled within the bottom frame 16, inwardly of the vertical webs 16' and rest upon the horizontal webs 17'. These sides 29 and ends 30 are secured to the vertical webs 16' by rivets 31. The vertical edges of the sides 29 and ends 30 meet, and are arranged within vertical corner angle-irons 32, and are rigidly secured thereto by rivets 33. The corner angle-irons 32 have their lower ends welded to the upper edges of the vertical webs 16', as shown at 16A, while the upper ends of the corner angle-irons 32 are welded to the lower edges of the vertical webs 24, as shown at 17A, Figure 5A. The intermediate metal straps 34 are arranged upon the outer faces of the sides 29, at their longitudinal centers and are rigidly secured to the sides 29 by rivets 35 or the like. The lower ends of the straps 34 are rigidly secured to the upper edges of the vertical webs 16', by welding, as shown at 34', while the upper ends of the straps are rigidly secured to the lower edges of the vertical webs 24, by welding, as shown at $34^2$. The vertical webs 24 of the top frame are arranged upon the outer faces of the sides 29 and ends 30, and are rigidly secured thereto by rivets 35', Figure 5.

A cover is provided for the top frame 22. This cover includes sheet metal side and end sections 36 and 37. These sections are substantially identical. Each covering section includes a horizontal web 38 and a vertical depending web 39. The cover sections 36 and 37 engage and terminate at 40, Figure 2. Each horizontal web 38 is bent downwardly at its outer edge forming a depending flange 42, bent upon itself at 43, to provide a rounded edge and two layers, as shown. The flange 42 covers the outer edge of the horizontal web 23 and projects slightly below the same. The vertical web 39 is bent upon itself at 44, forming a rounded edge and two layers. The two layers of the flange 39 have openings receiving the rivets 35', Figure 5. The flanges 39 are upon the inner faces of the sides 29 and ends 30, as shown.

Disposed at the corners of the frame 22 are corner sockets 45, which cover the ends of the horizontal webs 23 and the ends of the cover sections 36 and 37. These corner sockets are held in place by rivets 46, passing through the horizontal webs 23 and 38.

If desired, horizontal reenforcing bars 46', may be disposed upon the outer faces of the sides 29 and ends 30, and secured thereto by rivets 47'.

Arranged beneath and near the ends of the bottom of the truck are brackets 47, carrying wheels 48, which are preferably equipped with rubber tires. These brackets are at the transverse centers of the bottom and engage with the metal slats 19 and are rigidly secured thereto by welding, as shown at 49'. The inner ends of the brackets 47 engage with the depending webs of the angle-irons 21 and are rigidly secured thereto by welding along the lines 49. The outer ends of the brackets 47 project into keepers 50, rigidly secured to the horizontal webs 17', by welding. The numeral 51 designates brackets carrying wheels 52, equipped with rubber tires. The brackets 51 are disposed beneath the bottom of the truck and their ends engage the depending webs of the angle-irons 20 and are rigidly secured thereto by welding along the lines 53. The brackets 47 and 51 and their wheels are identical and are interchangeable. The brackets 51 are arranged at a lower elevation with respect to the bottom of the truck than the brackets 47, and this causes the wheels 52 to extend down below the elevation of the wheels 48, as shown in Figure 3. This renders it possible to vertically tilt the truck upon the wheels 52, which aids in steering the truck.

In Figures 6 to 10 inclusive, I have shown a modification of the truck. This truck is provided with rounded ends or corners, so that it will readily glance off of an obstruction, when striking the same. This truck comprises a bottom frame 54, formed from an angle-iron, having vertical and horizontal webs 55 and 56. The frame 54 is elongated and its ends are rounded, as shown. The bottom of the truck includes the bottom frame 54 and metal slats 57 and angle-irons 58 and 59, and these slats and angle irons are rigidly secured to the horizontal web 56 by welding. Brackets 60 are arranged beneath the bottom and at the ends of the bottom at its transverse center and are welded to the metal slats and to the angle-irons 59 and their outer ends are held within keepers 61, welded to the horizontal web 56. The brackets 60 carry wheels 61'. Brackets 62 carrying wheels 63 are arranged between the angle-irons 58 and are welded to the same, and the brackets 62 and their wheels 63 are identical with the brackets 60 and their wheels 61' and are interchangeable therewith. The brackets 62 are at a lower elevation than the brackets 60 with respect to the bottom of the truck so that the wheels 63 extend down below wheels 61', permitting the truck to be tilted transversely upon the wheels 63, to aid in steering. This construction of the bottom and the wheels carried thereby is substantially identical with the bottom and wheels embodied in the first form of the truck.

The truck comprises an upper elongated horizontal frame 64, including a horizontal web 65 and a vertical depending web 66. The numeral 67 designates outer vertical side straps, formed of metal, and the lower ends of these side straps are welded to the upper edges of the vertical webs 55, along lines 68, and their upper ends are welded to the vertical web 66 along the lines 69. Intermediate horizontal straps 70 are disposed near the longitudinal centers of the vertical straps 67 and are welded thereto along lines 71 and curved horizontal metal straps 72 are provided, at the ends of the truck, and are welded to the vertical straps 67 along the lines 73. The body portion of the truck includes side sheets 74, formed of fiber, which are flat, and end sheets 75, formed of fiber, which are bent to correspond to the curvature of the horizontal metal straps 72 and the ends of the upper and lower frames. The sheets 74 and 75 are disposed inwardly of the straps 67, 70, and 72, and the vertical edges of these sheets abut. These sheets are also arranged inwardly of the vertical webs 55 and 66 and outwardly of frames 55' and 66'. The sheets 74 and 75 are secured to the vertical web 66 by rivets 76, which pass through openings in the frame 66' and to the vertical webs 55 by rivets 77, which pass through openings in the frame 55'. The sheets 74 are secured to the metal strips 67 and 70 by rivets 78 and 79, and the end sheets 75 are secured to the vertical web 66 and frame 66' by rivets 80. The end sheets 75 are secured to the vertical web 55 and frame 55' by rivets 81, and are secured to the vertical straps 67 by rivets 82 and are secured to the curved straps 72 by rivets 83. Disposed upon the inner faces of the sheets 74 and 75 at their meeting edges and in alignment with the straps 67, are vertical straps 84, secured to the sheets 74 and 75 by the rivets 78 and 82. At their top and bottom ends, each strap 84 is arranged inwardly of the frames 55' and 66'. The upper end of each strap 84 is secured to rivets 76', passing through elements 66', 74 or 75 and 66. The identical construction is provided at the bottom of the inner straps 84, the rivets 81' passing through the strap 84 and frame 55', elements 74 and 75 and vertical web 55.

I have provided a truck having a strong bottom so that the wheels may be properly mounted upon the bottom. The bottom will not catch with the filling or yarn. The truck may be tilted transversely upon the intermediate wheels, to render steering easy. The truck is relatively light and durable.

It is to be understood that the forms of my invention herewith shown and described are to be taken as preferred examples of the same and that various changes in the shape, size, and arrangement of parts may be resorted to without departing from the spirit of my invention or the scope of the subjoined claim.

Having thus described my invention, what I claim is:

A truck for transporting bobbins, quills or spools, comprising a lower frame including sides and ends, the sides and ends being L-shaped in cross section and embodying horizontal and vertical webs, substantially flat spaced metal slats extending transversely of the frame continuously from one side to the other and arranged beneath such sides and welded to the horizontal webs of such sides, intermediate transverse metal bars formed L-shaped in cross section and arranged between certain of the spaced slats and including horizontal and vertical webs, the metal bars extending continuously from one side of the frame to the other side and arranged beneath the horizontal webs of such sides and welded thereto, the vertical webs of the angle bars projecting below the horizontal webs of the angle bars and the lower faces of the slats, brackets including bases arranged between the vertical webs of the angle bars spaced from the horizontal webs of the angle bars and the slats between the angle bars and welded to the lower edges of the vertical webs, wheels mounted upon the brackets, end transverse metal bars formed L-shaped in cross section and arranged between certain of the spaced metal slats and including horizontal webs and vertical webs, the last named end metal bars extending continuously from one side of the frame to the other side and arranged beneath the horizontal webs of the sides of such frame and welded to such horizontal webs, the vertical webs of the last named end metal bars projecting below the horizontal webs of such angle bars and below the faces of the metal slats, keepers secured to the horizontal webs of the ends of the frame near the transverse center of such frame and having inwardly facing horizontal webs and an opening above such webs, brackets including bases having their outer ends arranged within the openings of the keepers above the horizontal webs of the keepers and their inner ends substantially contacting with the vertical webs of the last named end angle bars and also engaging with the horizontal webs of such angle bars and the lower faces of the adjacent slats and being welded in place, and a body mounted upon the frame.

JOHN C. PADDOCK.

REFERENCES CITED

The following references are of record in the file of this patent:

UNITED STATES PATENTS

| Number | Name | Date |
| --- | --- | --- |
| 865,601 | Loyd | Sept. 10, 1907 |
| 885,977 | Brown | Apr. 28, 1908 |
| 918,819 | Bowers | Apr. 20, 1909 |
| 1,239,498 | Madigan | Sept. 11, 1917 |
| 1,432,296 | Mosel | Oct. 17, 1922 |
| 1,895,844 | Contois | Jan. 31, 1933 |
| 2,002,836 | Rossi | May 28, 1935 |
| 2,201,533 | Goldman | May 21, 1940 |
| 2,297,097 | Best | Sept. 29, 1942 |